(12) United States Patent
Savoly et al.

(10) Patent No.: US 7,033,432 B2
(45) Date of Patent: *Apr. 25, 2006

(54) PLASTER COMPOSITION AND METHOD OF MAKING SAME

(75) Inventors: Arpad Savoly, Martinsville, NJ (US); Dawn P Elko, Flemington, NJ (US); Bennie Veal, Rome, GA (US)

(73) Assignee: GEO Speciality Chemicals, Inc., Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/049,363

(22) Filed: Feb. 2, 2005

(65) Prior Publication Data

US 2005/0224007 A1    Oct. 13, 2005

Related U.S. Application Data

(60) Continuation-in-part of application No. 10/701,807, filed on Nov. 5, 2003, which is a division of application No. 10/214,467, filed on Aug. 7, 2002, now Pat. No. 6,774,146.

(51) Int. Cl.
*C04B 11/00* (2006.01)
*C04B 16/00* (2006.01)

(52) U.S. Cl. ............................ 106/781; 106/778
(58) Field of Classification Search ........... 106/778, 106/781
See application file for complete search history.

(56) References Cited

U.S. PATENT DOCUMENTS

| | | |
|---|---|---|
| 2,141,569 A | 12/1938 | Tucker |
| 3,193,575 A | 7/1965 | Nebel et al. |
| 3,686,133 A | 8/1972 | Hattori et al. |
| 4,156,615 A | 5/1979 | Cukier |
| 4,184,887 A | 1/1980 | Lange et al. |
| 4,460,720 A | 7/1984 | Gaidis et al. |
| 4,518,652 A | 5/1985 | Willoughby |
| 4,601,758 A | 7/1986 | Nelson |
| 4,676,835 A | 6/1987 | Green et al. |
| 4,678,515 A | 7/1987 | Green et al. |
| 4,725,665 A | 2/1988 | Pieh et al. |
| 4,853,085 A | 8/1989 | Johnstone et al. |
| 5,158,612 A | 10/1992 | Savoly et al. |
| 5,240,639 A | 8/1993 | Diez et al. |
| 5,250,578 A | 10/1993 | Cornwell |
| 5,474,971 A | 12/1995 | Sandell |
| 5,714,001 A | 2/1998 | Savoly et al. |
| 6,171,388 B1 | 1/2001 | Jobbins |
| 6,492,450 B1 | 12/2002 | Hsu |
| 6,755,907 B1 * | 6/2004 | Westerman et al. ......... 106/778 |
| 6,774,146 B1 * | 8/2004 | Savoly et al. ............... 516/66 |
| 2004/0028956 A1 * | 2/2004 | Savoly et al. ............... 428/703 |
| 2004/0091751 A1 * | 5/2004 | Savoly et al. ............... 428/703 |
| 2004/0092676 A1 * | 5/2004 | Savoly et al. ............... 525/535 |

FOREIGN PATENT DOCUMENTS

| | | |
|---|---|---|
| CA | 2003989 | 6/1990 |
| WO | WO2004/014531 | 2/2004 |

* cited by examiner

*Primary Examiner*—Anthony J. Green
(74) *Attorney, Agent, or Firm*—Rankin, Hill, Porter & Clark LLP

(57) ABSTRACT

The present invention provides a plaster composition that includes calcined gypsum and a naphthalene sulfonate-aldehyde condensate alkali salt polymer having a weight average molecular weight from about 17,000 to about 47,000. The present invention also provides a method of forming a plaster composition that includes belending calcined gypsum and a naphthalene sulfonate-aldehyde condensate alkali salt polymer having a weight average molecular weight from about 17,000 to about 47,000 together to form a dry blend and contacting the dry blend with water to form a hardenable aqueous slurry.

12 Claims, 1 Drawing Sheet

PLASTER COMPOSITION AND METHOD OF MAKING SAME

CROSS-REFERENCE TO RELATED APPLICATIONS

This application is a continuation-in-part of U.S. application Ser. No. 10/701,807, filed Nov. 5, 2003, which is a division of U.S. application Ser. No. 10/214,467 (now U.S. Pat. No. 6,774,146), filed Aug. 7, 2002.

BACKGROUND OF THE INVENTION

1. Field of Invention

The present invention relates to a plaster composition and a method of making the same. More particularly, the present invention relates to a plaster composition comprising a high molecular weight dispersant.

2. Description of Related Art

Gypsum is a mineral that predominantly comprises calcium sulfate dihydrate ($CaSO_4 \cdot 2H_2O$). The partial dehydration of gypsum, typically via calcination, forms calcium sulfate hemihydrate ($CaSO_4 \cdot \frac{1}{2}H_2O$), which is generally known in the art as plaster. The calcination of gypsum at atmospheric pressure tends to form the beta-gypsum form of plaster whereas calcination of gypsum under elevated pressure tends to form the alpha-gypsum form of plaster. The dry plaster material can be mixed with water to form a variety of hardenable compositions such as, for example, molding plasters, skim coatings and joint compounds.

The setting reaction involves the reaction of calcium sulfate hemihydrate and water to form calcium sulfate dihydrate. The theoretical water required to convert the calcium sulfate hemihydrate to calcium sulfate dihydrate is only 18.7% by weight on a theoretical weight basis. However, considerable excess water is required to fluidize the dry plaster and to obtain a flowable slurry. The amount of excess water depends upon factors such as the form of plaster used and the presence or absence of additives in the plaster composition. For example, Lange et al., U.S. Pat. No. 4,184,887, disclose that naphthalene sulfonic acid formaldehyde condensation polymers having a molecular weight from about 300 to about 3,000 can be used as non-discoloring water reducers in plaster compositions.

BRIEF SUMMARY OF THE INVENTION

The present invention provides a plaster composition and a method of making the same. In accordance with the invention, the plaster composition according to the invention comprises calcined gypsum and a dispersant. The dispersant is a naphthalene sulfonate-aldehyde condensate alkali salt polymer having a weight average molecular weight of from about 17,000 to about 47,000. The alkali is preferably an alkali metal and/or an alkaline earth metal. The aldehyde is preferably formaldehyde.

Conventional dispersants used in plaster compositions have a weight average molecular weight of less than about 14,000, and most often, less than or equal to about 10,000. Applicants have surprisingly discovered that when a higher molecular weight dispersant is used, the dispersing effect is increased and the same or better slurry handling properties can be achieved with less loading of the additive. A dispersant having a weight average molecular weight of about 22,000 is presently preferred.

In accordance with the method of the invention, a plaster composition is formed by blending dry, calcined gypsum with a dispersant comprising a naphthalene sulfonate-aldehyde condensate alkali salt polymer having a weight average molecular weight of from about 17,000 to about 47,000 and water. Preferably, the dispersant and the dry, calcined gypsum are pre-blended prior to being contacted with water.

The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

DETAILED DESCRIPTION OF THE INVENTION

Figure 1:
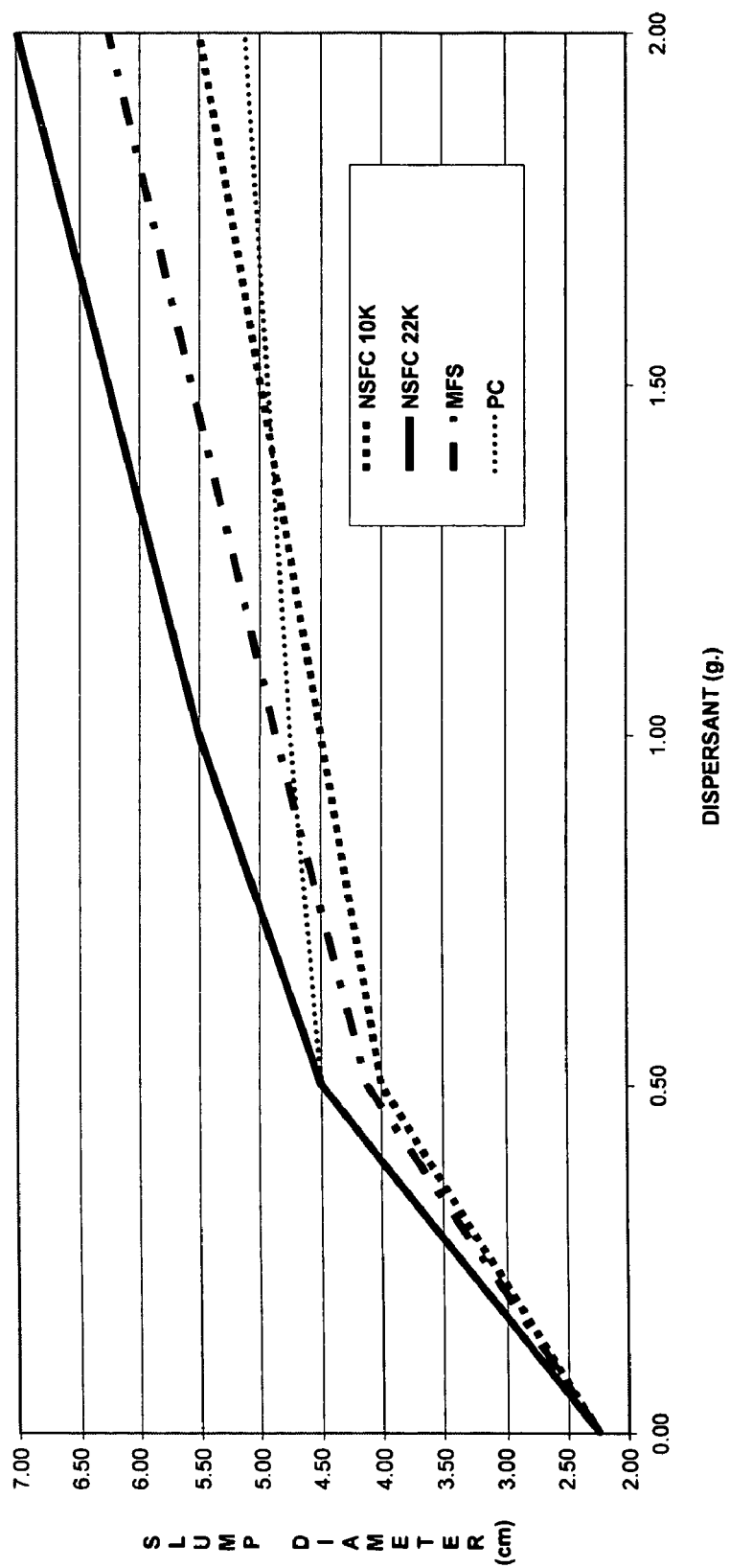
FIG. 1 is a graph showing slump diameter as a function of molecular weight and dosage.

The dispersant used in the plaster composition and method according to the invention comprises a naphthalene sulfonate-aldehyde condensate salt polymer, and more preferably an alkali metal and/or an alkaline earth metal naphthalene sulfonate-aldehyde condensate polymer. Naphthalene sulfonate-aldehyde condensate salt polymers are well known in the art, and are described, for example, in Tucker, U.S. Pat. No. 2,141,569, Hattori et al., U.S. Pat. No. 3,686,133, and Pieh et al., U.S. Pat. No. 4,725,665. Such compounds are prepared by sulfonating naphthalene and/or alkyl naphthalene (where the alkyl group contains from about 1 to about 9 carbon atoms) with concentrated sulfuric acid, oleum (also known as fuming sulfuric acid), chlorosulfonic acid and/or sulfur trioxide at a mole ratio of acid to aromatic of from about 0.5 to about 1.5, and more preferably about 0.75 to about 1.4. Sulfonation is typically accomplished at a temperature of from about from about 15° C. to about 190° C., and more preferably from about 40° C. to about 170° C., and most preferably from about 140° C. to about 160° C.

The naphthalenesulfonic acid thus formed is then condensed with an aldehyde. Formaldehyde is the presently most preferred aldehyde for use in the invention, but paraformaldehyde, gluteraldehyde, and other conventional aldehydes can also be used. A variety of condensation methods can be employed, including continuous, incremental, or all-at-once addition of the aldehyde to the aqueous aromatic mass. The degree of polymerization is such that when using a standard GPC column, and sulfonated polystyrene as a standard, the weight average molecular weight is from about 17,000 to about 47,000, and most preferably about 22,000. Weight average molecular weight ranges of 20,500 to about 27,000 are very useful in the invention.

It is critical to the practice of the invention that the weight average molecular weight of the naphthalene sulfonate-formaldehyde condensate salt polymer be at least about 17,000. At molecular weights below 17,000, the improvement in slump and handling of the plaster compositions is not observed. It is possible to produce naphthalene sulfonate-formaldehyde condensate salt polymers having weight average molecular weights as high as about 60,000, but at molecular weights above 47,000, the viscosity of the polymer becomes so high that there is a significant risk of not being able to remove the polymer from the reactor vessel.

After the condensation reaction, the condensate is brought to a pH preferably between 7 and 9 using an alkali, most preferably an aqueous solution of an alkali and/or an alkaline earth metal base. The alkali reacts with the condensate to form a salt polymer, most preferably an alkali metal and/or an alkaline earth metal naphthalene sulfonate-aldehyde condensate salt polymer. Suitable alkalis for use in the invention include, for example, the hydroxides, oxides, and carbonates of ammonium, sodium, potassium, and calcium.

It will be appreciated that the weight average molecular weight of the resulting naphthalene sulfonate-aldehyde condensate salt polymer may be adjusted by varying the mole equivalents of aldehyde that are reacted with the sulfonated naphthalene during the condensation reaction. A mole ratio of formaldehyde to naphthalene sulfonate of about 1.25:1.00 will result in the production of a naphthalene sulfonate-formaldehyde condensate salt polymer having a weight average molecular weight of about 22,000, which is presently most preferred. Reducing the mole ratio of aldehyde to naphthalene sulfonate will result in a naphthalene sulfonate-aldehyde condensate salt polymer having a lower weight average molecular weight.

Applicants surprisingly discovered that the dispersing effect of a higher weight average molecular weight naphthalene sulfonate-aldehyde condensate salt polymer (e.g., 22,000) is superior to the dispersing effect obtained through the use of a similar polymer having a lower weight average molecular weight (e.g., 10,000) at the same solids loading ratio. Moreover, it is possible to achieve the same slump using about half as much of the high molecular weight dispersant as the conventional plaster dispersant.

The present invention also provides a method of forming a plaster composition. In accordance with the method of the invention, dry calcined gypsum is blended with a naphthalene sulfonate-aldehyde condensate alkali salt polymer having a weight average molecular weight from about 17,000 to about 47,000 and water. The dry calcined gypsum and the naphthalene sulfonate-aldehyde condensate alkali salt polymer are preferably pre-blended before being contacted with the water. Upon addition of the water, a hardenable plaster slurry is formed that can used in conventional plaster applications such as, for example, molding plasters, skim coatings and joint compounds.

The following examples are intended only to illustrate the invention and should not be construed as imposing limitations upon the claims. Unless otherwise stated, all temperatures are in degrees centigrade, all pressures are atmospheric, and all molecular weights reported are weight average molecular weights.

EXAMPLE 1

1.0 mole of naphthalene was added to a reaction vessel equipped with a condenser. The naphthalene was heated to 150° C. and stirred. 1.0 mole of sulfuric acid was added drop wise and the mixture was held at that temperature for 2 hours. The mixture was allowed to cool to 90° C. and 10 moles of water were added and the temperature was maintained. To this mixture, 1.25 moles of formaldehyde were added as a 37% by weight solution in water. The mixture was heated to 105° C. and stirred until all of the free formaldehyde was consumed. The reaction mixture was cooled to 50° C. and a 50% by weight solution of sodium hydroxide in water was added to the reaction mixture to adjust the pH thereof to 8. The weight average molecular weight of the resulting naphthalene sulfonate-formaldehyde condensate alkali salt polymer was determined to be about 22,000.

EXAMPLE 2

100 grams of dry, calcined plaster was placed into mixing cups marked as Samples A through M. With the exception of Sample A, which was a control, an amount of one of:

(1) a 10,000 weight average molecular weight naphthalene sulfonate-formaldehyde condensate salt polymer dispersant ("NSFC 10K") commercially available from Geo Specialty Chemicals of Cleveland, Ohio under the trade designation LOMAR D;

(2) the 22,000 weight average molecular weight naphthalene sulfonate-formaldehyde condensate alkali salt polymer dispersant ("NSFC 22K") formed in Example 1;

(3) a commercially available melamine formaldehyde sulfonate dispersant ("MFS"); or (4) a commercially available polycarboxylate dispersant ("PC"); was added to and dry-blended with the contents of each mixing cup as shown in Table 1 below. 50 grams of water was then added to each mixing cup and blended by rapid hand stirring for 30 seconds. Immediately after mixing, the resulting aqueous plaster slurry was poured directly onto a clean glass surface from a height of 4 cm. A roughly uniform diameter circular disc or patty was formed in each case. The discs were allowed to set thoroughly and when completely set (hardened/dried), were removed from the glass surface using a metal spatula. The discs were turned over and their diameters were measured across two set points through the center. The mean diameter of each disc was reported as Slump Diameter (cm). Table 1 below lists the Slump Diameter (cm) as a function of dispersant loading and dispersant molecular weight.

TABLE 1

| Sample | Dispersant | Dispersant Loading | Slump Diameter |
| --- | --- | --- | --- |
| A | — | 0.00 g. | 2.25 cm |
| B | NSFC 10 K | 0.50 g. | 4.00 cm |
| C | NSFC 22 K | 0.50 g. | 4.50 cm |
| D | MFS | 0.50 g. | 4.00 cm |
| E | PC | 0.50 g. | 4.50 cm |
| F | NSFC 10 K | 1.00 g. | 4.50 cm |
| G | NSFC 22 K | 1.00 g. | 5.50 cm |
| H | MFS | 1.00 g. | 4.80 cm |
| I | PC | 1.00 g. | 4.75 cm |
| J | NSFC 10 K | 2.00 g. | 5.50 cm |
| K | NSFC 22 K | 2.00 g. | 7.00 cm |
| L | MFS | 2.00 g. | 6.25 cm |
| M | PC | 2.00 g. | 5.10 cm |

The data in Table 1 is also shown in FIG. 1, which is a graph showing slump diameter as a function of dispersant loading. The data shows that only half as much of the higher molecular weight naphthalene sulfonate-formaldehyde condensate salt polymer dispersant (Sample C) is needed to get the same slump diameter as can be achieved using the lower molecular weight dispersant (Sample F). Furthermore, at the same dispersant loading, a substantial improvement in slump diameter is seen in each case when the higher molecular weight naphthalene sulfonate-formaldehyde condensate salt polymer dispersant is used in place of a commercially available dispersant.

The conditions and loadings used to form Samples G and K were repeated twice to verify the consistency and repeatability of the results. The slump results for Sample G were the same in each case (5.50 in. three times). The slump results for Sample K were 7.00 in., 7.125 in., and 7.125 in.

Thus, the initial observations in slump improvement were both consistent and repeatable.

Additional advantages and modifications will readily occur to those skilled in the art. Therefore, the invention in its broader aspects is not limited to the specific details and illustrative examples shown and described herein. Accordingly, various modifications may be made without departing from the spirit or scope of the general inventive concept as defined by the appended claims and their equivalents.

What is claimed is:

1. A plaster composition comprising:
   calcined gypsum; and
   a naphthalene sulfonate-aldehyde condensate alkali salt polymer having a weight average molecular weight from about 17,000 to about 47,000.

2. The plaster composition according to claim 1 wherein the aldehyde in the naphthalene sulfonate-aldehyde condensate alkali salt polymer is selected from the group consisting of formaldehyde, paraformaldehyde, and gluteraldehyde.

3. The plaster composition according to claim 1 wherein the calcined gypsum and the naphthalene sulfonate-aldehyde condensate alkali salt polymer are dry-blended together.

4. The plaster composition wherein the aldehyde in the naphthalene sulfonate-aldehyde condensate alkali salt polymer is formaldehyde.

5. The plaster composition according to claim 4 wherein the naphthalene sulfonate-aldehyde condensate alkali salt polymer is a sodium salt.

6. The plaster composition according to claim 4 wherein the naphthalene sulfonate-aldehyde condensate alkali salt polymer is a calcium salt.

7. A method of forming a plaster composition comprising:
   blending calcined gypsum and a naphthalene sulfonate-aldehyde condensate alkali salt polymer having a weight average molecular weight from about 17,000 to about 47,000 together to form a dry blend; and
   contacting the dry blend with water to form a hardenable aqueous slurry.

8. The method of forming a plaster composition according to claim 7 wherein the aldehyde in the naphthalene sulfonate-aldehyde condensate alkali salt polymer is selected from the group consisting of formaldehyde, paraformaldehyde, and gluteraldehyde.

9. The method of forming a plaster composition according to claim 7 wherein the calcined gypsum and the naphthalene sulfonate-aldehyde condensate alkali salt polymer are dry-blended together.

10. The method of forming a plaster composition according to claim 7 wherein the aldehyde in the naphthalene sulfonate-aldehyde condensate alkali salt polymer is formaldehyde.

11. The method of forming a plaster composition according to claim 10 wherein the naphthalene sulfonate-aldehyde condensate alkali salt polymer is a sodium salt.

12. The method of forming a plaster composition according to claim 10 wherein the naphthalene sulfonate-aldehyde condensate alkali salt polymer is a calcium salt.

* * * * *